United States Patent
Aholainen et al.

(10) Patent No.: US 7,280,832 B2
(45) Date of Patent: Oct. 9, 2007

(54) METHOD AND APPARATUS FOR AUTOMATICALLY SELECTING A BEARER FOR A WIRELESS CONNECTION

(75) Inventors: Markus Aholainen, Pirkkala (FI); Holger Hussmann, Tampere (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 10/612,398

(22) Filed: Jul. 1, 2003

(65) Prior Publication Data
US 2005/0003822 A1 Jan. 6, 2005

(51) Int. Cl.
*H04Q 7/20* (2006.01)
(52) U.S. Cl. .................. 455/445; 455/435.2; 455/428
(58) Field of Classification Search ............. 455/445, 455/446, 434, 428, 435.2; 370/328, 332, 370/333
See application file for complete search history.

(56) References Cited

U.S. PATENT DOCUMENTS

| | | | | |
|---|---|---|---|---|
| 6,119,003 A * | 9/2000 | Kukkohovi | ............... | 455/435.2 |
| 2003/0055912 A1 * | 3/2003 | Martin et al. | ................ | 709/218 |
| 2003/0060168 A1 * | 3/2003 | Teibel | .......................... | 455/69 |
| 2003/0214940 A1 * | 11/2003 | Takken | ........................ | 370/352 |
| 2004/0202187 A1 * | 10/2004 | Kelly et al. | .................. | 370/401 |
| 2004/0203354 A1 * | 10/2004 | Yue | ............................. | 455/41.1 |
| 2004/0243684 A1 * | 12/2004 | Ha et al. | ..................... | 709/208 |
| 2005/0003816 A1 * | 1/2005 | Vardoulias et al. | ....... | 455/435.2 |
| 2005/0037755 A1 * | 2/2005 | Hind et al. | .............. | 455/435.3 |
| 2006/0133307 A1 * | 6/2006 | Fukasawa et al. | .......... | 370/328 |

* cited by examiner

*Primary Examiner*—Duc M. Nguyen
*Assistant Examiner*—Dai Phuong
(74) *Attorney, Agent, or Firm*—Ware, Fressola, Van Der Sluys & Adolphson LLP (57) ABSTRACT

A method and corresponding equipment providing automatic bearer selection so that a user of a telecommunications device (11) can establish a connection with another user without having to indicate a bearer to use, i.e. in case the other user is reachable using different bearers (communication technologies) such as Bluetooth, UTRAN or WLAN, and even in case the other user can be reached via more than one telecommunication device. To enable a device (11) to automatically select a bearer for providing a connection (14) to a second device (12), the method includes: a step (24) in which the first device (11) refers to a contacts bearer data store (11*d* 11*d*) accessible to the first device (11) to obtain a list of at least two possible bearers for providing the connection (14); and a step (28) in which the first device (11) selects one of the at least two possible bearers based on a predetermined selection strategy (11*b*).

26 Claims, 4 Drawing Sheets

| Name | Bearer ID/Technology | Address | Secret |
|---|---|---|---|
| John | BT | aa:bb:cc:dd:ee:ff | a76f7e7f123fade |
| Linda | BT | aa:bb:cc:dd:ee:01 | 908dkjs |
| Linda | WLAN | aa:aa:aa:aa:aa:ab | 908dkjs |

11d'

METHOD AND APPARATUS FOR AUTOMATICALLY SELECTING A BEARER FOR A WIRELESS CONNECTION

TECHNICAL FIELD

The present invention pertains to the field of wireless communications. More particularly, the present invention pertains to the selection of a layer two bearer for providing a connection between devices communicating wirelessly.

BACKGROUND ART

Figure 3:
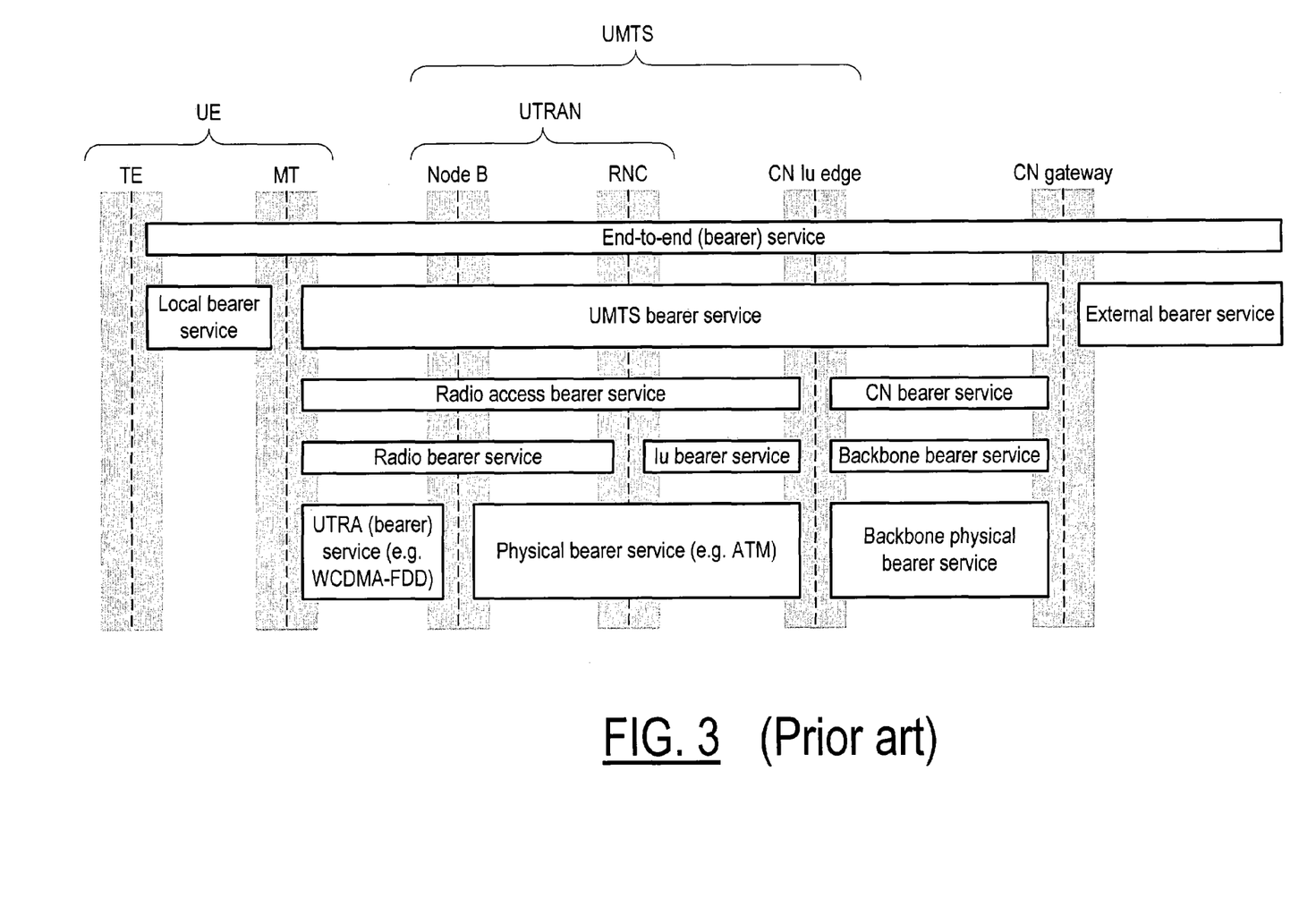
FIG. 3 is a schematic illustration of the bearer architecture in case of a connection using a UMTS network.

For a wireless device (such as a cellular phone) to create a connection to another telecommunication device (wireless or otherwise), a so-called bearer (service) must be selected. A bearer is, in general, a service providing a specified QoS (quality of Service) between two defined points in a telecommunication network. For example, as indicated in FIG. 3, in a communication via a UMTS (Universal Mobile Telecommunication System) network between a wireless terminal/user equipment (UE) device and another telecommunication device attached to another network than that to which the UE device is attached, an end-to-end (bearer) service is provided as a combination of bearer services between intermediate points in the communication path: a local bearer service is used to provide communication between the terminal equipment (TE) and mobile termination (MT) of the UE; a UMTS bearer service is sued to provide communication between the MT and a core network (CN) gateway to the other network; and an external bearer service provides communication between the CN and the other network. Since within the UMTS network some of the communication is wireless and some is not, the UMTS bearer service is itself a combination of bearer services, which are in some cases further partitioned. Thus, e.g. the UMTS bearer service includes a radio access bearer service for communication between the MT and the CN Iu edge (the edge of the CN that interfaces with CN gateways to other networks), and the radio access bearer service is itself a combination of a radio bearer service between the MT and the RNC (radio network controller) of the UTRAN (UMTS Terrestrial Radio Access Network) component of the UMTS network and an Iu bearer service (between the RNC and the CN Iu edge). The radio bearer service and the Iu bearer service (which are transport layer bearer services) are in combination mapped to (depend on) lower layer bearer services, namely a UTRA bearer service, such as WCDMA-FDD (Wideband Code Division Multiple Access-Frequency Division Duplex), and a physical bearer service for communication between the node B/base station and the CN Iu edge; the mapping is thus because of the different technologies by which the communication is accomplished (WCDMA-FDD vs. ATM (Asynchronous Transfer Mode), for example).

As used here, a "bearer" indicates a network that is an essential component of a communication path by which a wireless device communicates with another telecommunication device. Thus, examples of a bearer as that term is used here include: Bluetooth, UTRAN and WLAN (Wireless Local Area Network). Thus, a bearer as that term is used here, in case of UTRAN, indicates the UMTS bearer service as described above. (GSM's (Global System for Mobile Communication) SMS (Short Message Service) or CSD (circuit-switched data) are not bearers as that term is used here, but are instead services using a bearer, i.e. using a wireless technology.)

In cases where different bearers can be used to provide a desired connection between a wireless device and another telecommunication device, according to the prior art the user of the wireless communication device is sometimes given the opportunity (via a user interface) to select which bearer to use. A user will, in such an instance, typically rely on a predetermined strategy for deciding between the possible connections—such as always preferring the lowest cost connection, or always preferring the highest (dynamic) bandwidth (based e.g. on the number of devices interconnected via the bearer), or the connection that can be made the fastest (i.e. the lowest latency), and so on. Since users of telecommunication equipment typically do not want to make the same decisions over and over again, it would be advantageous to have wireless telecommunication equipment automatically select a bearer in case of a connection that can be made using different bearers.

DISCLOSURE OF THE INVENTION

Accordingly, in a first aspect of the invention, a method is provided by which a first device provides a connection to a second device, characterized by: a step in which the first device obtains association information including a list of at least two possible bearers for providing the connection; and a step in which the first device selects one of the at least two possible bearers based on a predetermined selection strategy or by trying each of the at least two possible bearers in turn until the connection is made; thereby automatically selecting a bearer for providing the connection to the second device without requiring an input by a user of the first device at the time of providing the connection.

In accord with the first aspect of the invention, the method may be characterized by: a step in which the association information is stored in a contacts bearer data store; and a step in which the first device refers to the contacts bearer data store accessible to the first device to obtain a list of at least two possible bearers for providing the connection. Further, the method may be even further characterized by: a step in which the first device refers to an owner bearer data store to obtain a list of bearers available to the first device and also refers to a bearer selection strategy data store to obtain the predetermined selection strategy; and a step in which the first device refers to the contacts bearer data store to obtain a list of possible bearers for providing the connection and an address for each of the possible bearers; and a step (26) in which the first device eliminates from the list of possible bearers any bearer that does not occur on the list of available bearers.

Also in accord with the first aspect of the invention, the method may be further characterized in that a public source of contact information is used in the step of obtaining association information.

Also in accord with the first aspect of the invention, the method may be further characterized in that in the step of obtaining association information, the second device communicates to the first device the association information needed by the first device for automatically selecting a bearer for communication with the second device.

Also in accord with the first aspect of the invention, the predetermined selection strategy may indicate selecting a bearer based on at least one of the following selection criteria: acceptable price; acceptable bandwidth; acceptable latency; as ordered in a list hosted in the first device; fastest to connect when the first device attempts to make different connections in parallel to the second device via different possible bearers; wherein the acceptable price, acceptable bandwidth, and acceptable latency are as compared to predetermined thresholds for price, bandwidth and latency. Further, the predetermined threshold for latency may indicate a minimum QoS requirement for the connection. Further still, the method may also include a step of periodically checking the QoS requirement during communication via the connection and initiating a bearer change if the QoS is no longer sufficient.

Still also in accord with the first aspect of the invention, the association information may include a bearer identifier for each of at least two different bearers associated with the second device. Further, the association information may also include an address for use with each bearer associated with the second device.

Still also in accord with the first aspect of the invention, in the step of selecting a bearer, the first device may attempt to connect to the second device based on an association of the second device linking the second device to a name of an intended recipient. Further, in the step of selecting a bearer, the first device may attempt to connect to the second device using the at least two different bearers included in the association information as associated with the second device.

In a second aspect of the invention, a computer program product is provided comprising: a computer readable storage structure embodying computer program code thereon for execution by a computer processor in a first device, the computer program code for use in providing for the first device a connection to a second device, the computer program code comprising instructions corresponding to the steps of the method provided by the first aspect of the invention.

A third aspect of the invention provides an apparatus in a first device for enabling the first device to provide a connection to a second device, the apparatus operative according to the method provided by the first aspect of the invention.

A fourth aspect of the invention provides a system comprising a first device and a second device, with the first device including an apparatus for enabling the first device to provide a connection to the second device according to the method provided by the first aspect of the invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides a method and equipment by which a wireless telecommunication device communicates with another telecommunication device using a bearer (i.e. a technology/network, such as a Bluetooth network or a UMTS network) that is automatically selected in case of more than one possible bearer. With the invention, a user is freed from the burden of having to select a bearer by which to communicate with another user, e.g. a bearer such as either Bluetooth or a UMTS network for sending a message using SMS. The invention provides a contacts database that maps or associates other users to possible communication technologies/bearers. One aspect of these associations is that once two users have exchanged associations, they may use services via proximity technologies and wide area technologies seamlessly and without special effort.

The invention is here described in the context of two wireless devices communicating with each other over a single bearer, such as a single UMTS (operator) network or a Bluetooth network, with both devices including the equipment required for communicating using different bearers, where at least two of the different bearers the first device can use are two of the different bearers the second device can use. However, it should be understood that the invention provides for a wireless telecommunication device to automatically select a bearer from among different possible bearers when communicating with another telecommunication device, not necessarily wireless, and even when the end-to-end communication extends over more than one network (i.e. requires more than one bearer), so that the communication path leading from the wireless terminal includes a first segment followed other segments, or in other words, so that a signal from the wireless device is conveyed first by a first bearer and then by other bearers. In case more than one network is involved, the bearer that is automatically selected is the bearer providing the first segment of the communication path, i.e. the first bearer. Also, the invention encompasses automatically selecting a bearer for communicating with another party or entity even in case of the other party or entity having to use different equipment, depending on which bearer is automatically selected.

Figure 1:
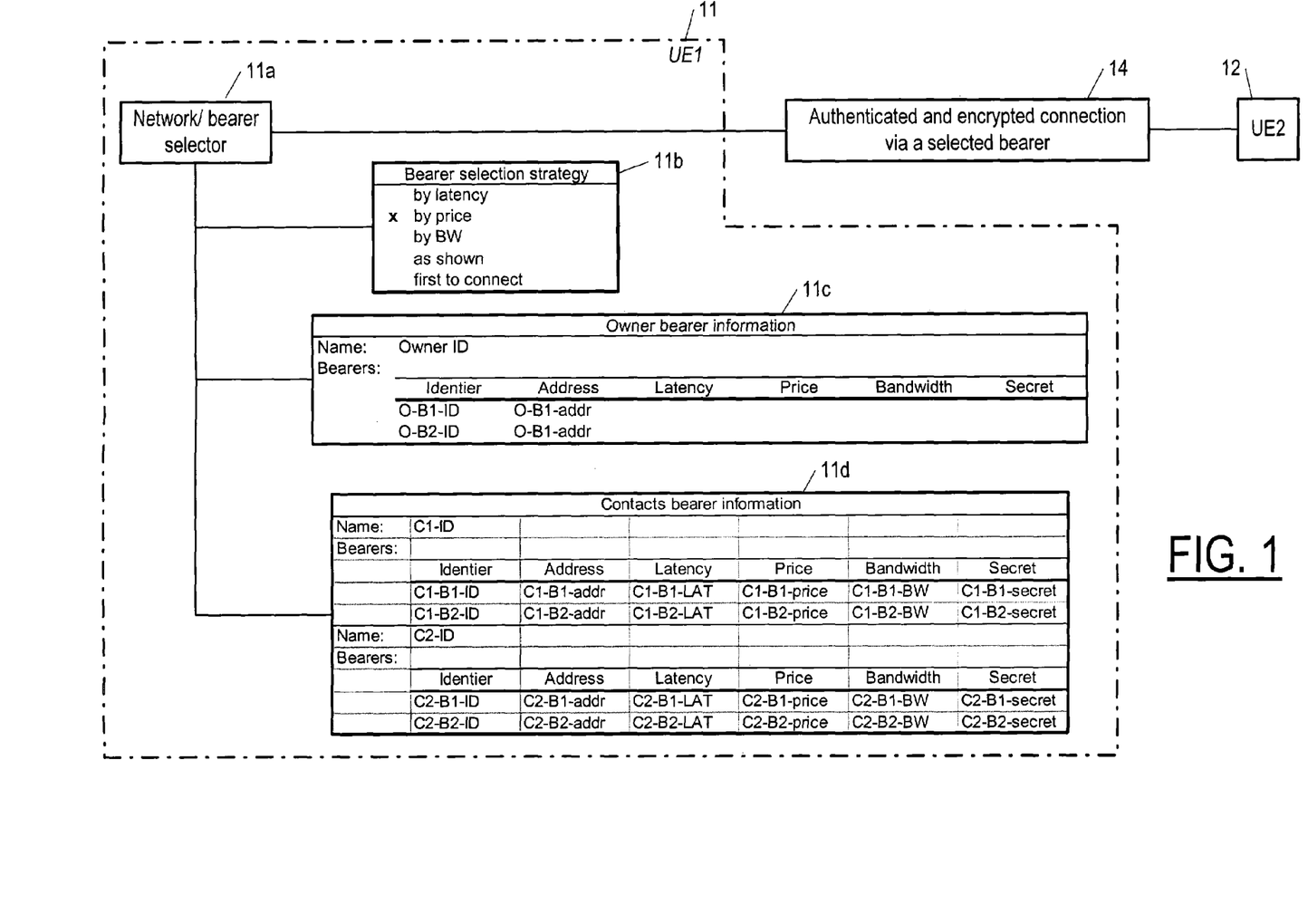
FIG. 1 is a block diagram/flow diagram of a wireless telecommunication device according to the invention, and so including the capability of automatically selecting a bearer from among several possible bearers for providing a connection to another telecommunication device, the different possible bearers being indicated in a contacts bearer data store.

Referring now to FIG. 1, a first wireless telecommunication device/user equipment (UE1) 11 is shown communicating with a second telecommunication device/user equipment (UE2) 12 via a connection 14 that is preferably authenticated and secure, and is provided by a bearer (service) automatically selected by a network/bearer selector (NS) 11a included as part of UE1. To automatically select the bearer for providing the connection 14, NS 11a refers to a data store 11d of bearer information (called here a contacts bearer data store) arranged by contact, i.e. by a name or identifier used to indicate a party. The bearer information includes at least one bearer identifier identifying a bearer by which the party/UE2 can at least sometimes be reached, and includes layer 2 (link layer) addresses—i.e. MAC (Media Access Control) addresses—of the wireless adapters available in the device, i.e. a layer 2 address for each identified bearer, which is the unique identifier for connecting to the device via the bearer.

In addition, the contacts bearer data store 11d also preferably includes, for each bearer and party (name), information that can be used to select which bearer to use, i.e. selection parameters, including latency (typical time to connect, preferably updated over time), price (e.g. last best price, or an average of some sort, which may be obtained by querying the service provider, and since certain bearers do not have a cost, e.g. Bluetooth when two devices are directly connected without a service provider of any kind, in some cases the price field is null), bandwidth (or throughput, typically some sort of average, as measured by the equipment). By bandwidth, what is meant here is dynamic bandwidth, based e.g. on the number of devices interconnected via the bearer, not the (static) bandwidth associated with a particular bearer (technology). The bandwidth (as used here) can be e.g. provided by a service provided by the operating system of the device/UE1 11.

In addition to selection parameters, the contacts bearer information so as to allow an authenticated or secure connection (or both), a shared secret, such as a key used for encryption. For example, the contacts bearer data store 11*d* includes a first name C1-ID for which the bearer information includes a first bearer identifier C1-B1-ID and corresponding address C1-B1-Addr, for which UE1 has determined for selection parameters a latency of C1-B1-LAT, a price of C1-B1-price, and a bandwidth of Cl-B-BW. Additionally, a shared secret C1-B1-secret is provided.

Still referring to FIG. 1, according to the invention, NS 11*a* preferably selects a bearer according to a predetermined bearer selection strategy as decided on by the user of UE1 and indicated via a user interface (not shown). The predetermined strategy is stored in a data store 11*b* to which NS 11*a* also refers in selecting which bearer to use, given a name for which a connection is to be made. Possible selection strategies include: according to one or another of the selection parameters—i.e. e.g. by latency, by price or by bandwidth; or according to the order in which the bearers are indicated in the contacts bearer data store 11*d* for the given name, i.e. as shown; or according to which connection is made first when the different possible bearers are tried in parallel.

Still referring to FIG. 1, it is of course not possible for UE1 to communicate via a bearer for which it does not have equipment, and so, UE1 according to some embodiments of the invention also includes an owner bearer information data store 11*c* indicating which bearers UE1 is equipped to use, and the address for UE1 for each indicated bearer. Depending on how the contacts bearer data store 11*d* is populated, it might include bearers that UE1 is not equipped to use, and so NS 11*a* will, in such embodiments, from among all available bearers indicated for a given name, consider as possible bearers only bearers that UE1 is equipped to use, i.e. only bearers also included in the owner bearer information data store 11*c*. There will be several communication media. Association may be done using an RFID (Radio Frequency Identification) technology and then services may be used over Bluetooth, etc. The RFID technology may be e.g. as specified or provided by RFID.org, on the Web at www.aimglobal.org/technologies/rfid/ which is a global trade association for providing automatic identification and data capture technologies.

Some of the information in the contacts database 11*d* (which may be part of or accessible by a phonebook or contacts application) for each person, identified by the identifier name, is relatively static, such as the, different wireless communication technologies-e.g. GPRS (General Packet Radio Service), WLAN, and so on—available in one or more mobile terminals used by the person and the address to be used in contacting the person using the respective wireless communication technology. In addition, the secret key does not change very often. Such (relatively) static information can be input to the database 11*d* by various means, even manually. Other information, however, is (more) dynamic; and, according to the invention, when contacting a person, instead of using the dynamic information in the contacts database 11*d* (which may have been stored at the last contact with the person being contacted), the most current values are preferably used, values, (such as for the layer 2 bandwidth) which are obtained from an appropriate source, such as the device operating system, from some other service (e.g. layer 3 QoS must be queried using a QoS service) or from the service provider (price). These values are each related to a bearer as opposed to the device; e.g. WLAN layer 2 bandwidth is in practice not related to the device being connected to, but are instead related to the WLAN bearer.

Figure 2:
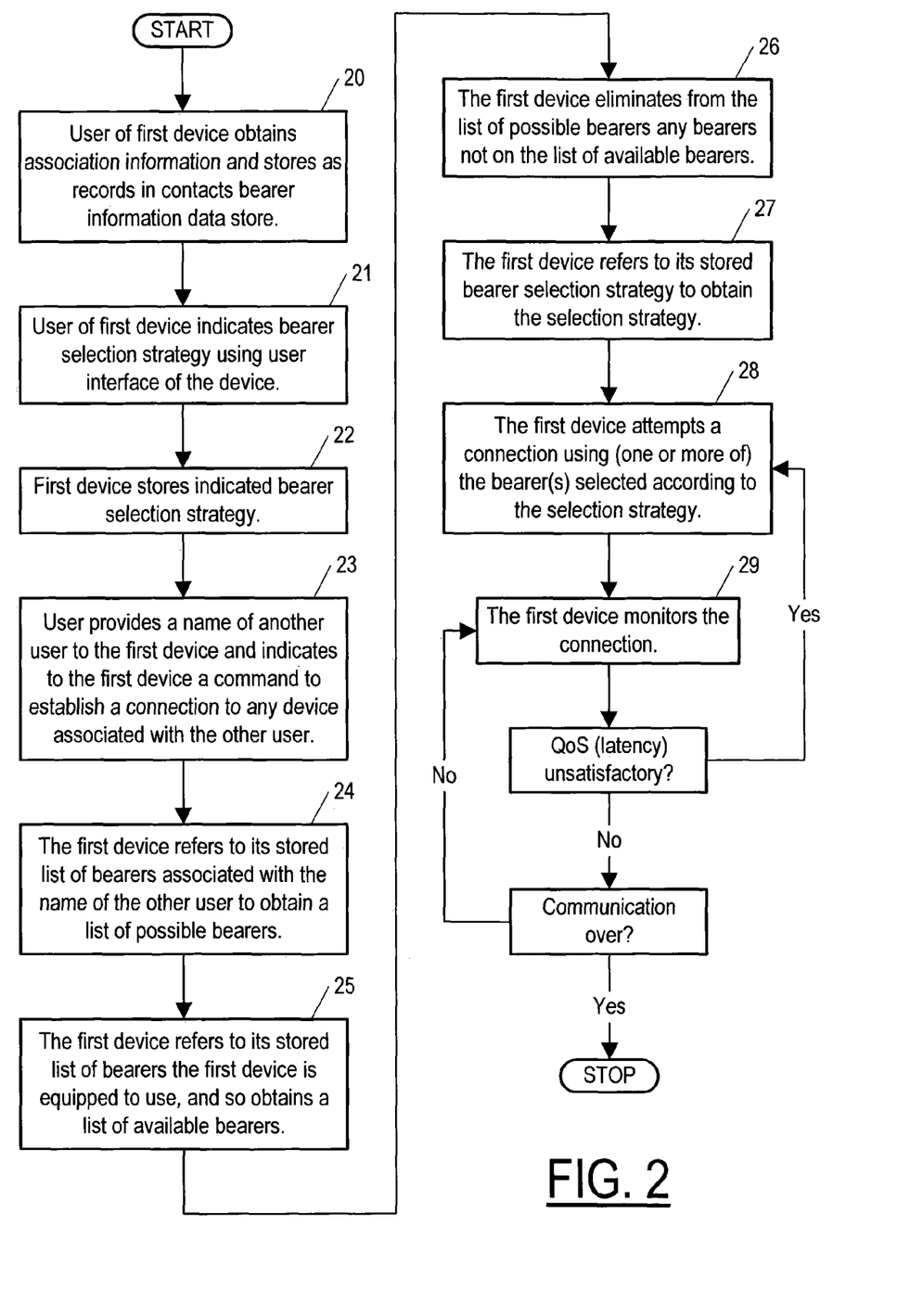
FIG. 2 is a flowchart of a method by which a wireless telecommunication device according to the invention automatically selects a bearer from among several possible bearers.

Referring now to FIG. 2, according to the invention, in a first step 20 a user of the first device 11 (FIG. 1) obtains association information for another user and stores the information as records in the contacts bearer data store 11*d*. In a next step 21, a user of the first device indicates a bearer selection strategy (using the user interface of the device). In a next step 22, the first device stores (information characterizing) the bearer selection strategy 11*b* indicated by the user. In a next step 23, to contact another user, a user of the first device provides to the first device a name (identifier, or person_id) for the other user and indicates to the first device a command to establish a connection to any device associated with the other user in the contacts database (contacts bearer information database) 11*d*. In a next step 24, the first device refers to its stored list of bearers associated with the other user in the contacts bearer information database 11*d*, and so obtains a list of possible bearers. In a next step 25, the first device refers to a list of the bearers the first device is equipped to use (stored in the owner bearer information database 11*c*), and so obtains a list of available bearers. In a next step 26, the first device eliminates from the list of possible bearers any bearers not on the list of available bearers. In a next step 27, the first device refers to its stored bearer selection strategy 11*b* to obtain the strategy for selecting one of the available bearers over all of the others, or for selecting to try in parallel two or more of the different available bearers in case the selection strategy is to select the bearer for which the connection can be made the fastest. In a next step 28, the first device attempts a connection using the one or more bearers selected according to the selection strategy, and attempts to connect to the other user using each of the bearers selected according to the selection strategy. In an optional next step 29, which would be executed most likely only in case of a minimum QoS requirement (determined e.g. by applications hosted by the first device 11 and the other device 12 and communicating over the connection 14), the first device 11 monitors the connection to check that it continues to provide an adequate QoS, i.e. adequate latency. If not, then the step 28 of establishing the connection is repeated, and depending on the selection strategy is likely to result in another bearer begin automatically selected.

Figure 4:
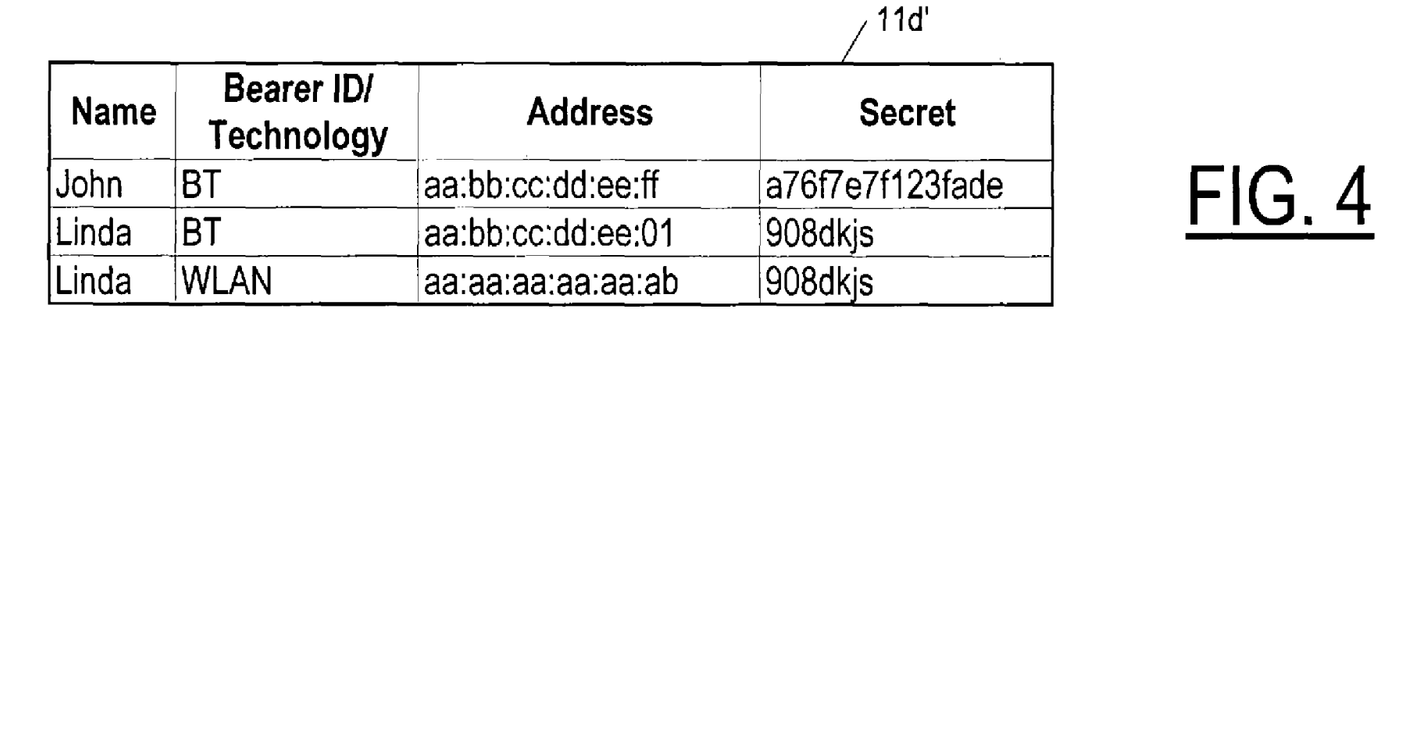
FIG. 4 is a schematic of another version of a contacts bearer data store, simplified compared to the version indicated in FIG. 1.

Referring now to FIG. 4, a simplified version of a contacts bearer data store (association database) 11*d'* according to the invention is shown, giving more real world examples of some of the fields for which systematically named examples are given in FIG. 1. (Thus, e.g. whereas in FIG. 1 the bearer identifiers are all of the form CX-BY-ID indicating a particular bearer (the Yth bearer) for Client X, in FIG. 4, the bearer identifiers are BT and WLAN.) Compared to the contacts bearer data store 11*d* of FIG. 1, the simplified contacts bearer data store 11*d'* includes only the bare essential information needed according to the invention; it does not include express selection parameters, but a preference for bearers may be implied by the order in which the different bearers for a person occur in the data store 11d'.

Besides using the contacts bearer data store 11d (or the simplified contacts bearer data store 11d') to automatically select a bearer by which to contact a desired person, the data store 11d may be used to match persons and their devices, e.g. for determining who is nearby by doing a MAC address inquiry and then comparing results with the MAC addresses in the association database/contacts bearer data store 11d. Seeking a device owned by a certain person is also possible by fetching the MAC addresses of the person from the association database/contacts bearer data store 11d and doing an inquiry or connection creation attempt to see if any of the MAC addresses are available.

The contacts bearer information for a target (other user) can be created as needed and then either stored or not stored as records in a contacts bearer data store 11d 11d'. In case of storing such information for future use, the relatively dynamic information would preferably be updated each time an attempt is made to reach a target.

As another example of the use of the invention, and in particular one in which the contacts bearer data store 11d 11d' is created dynamically (and then either discarded or stored for future use), a user sends a picture to another user (a target) using the invention as follows. The user uses a phonebook application to select the target (the other user) for the action (sending the picture). A module provided by the invention fetches the data required to automatically create the connection (i.e. to select a bearer without involving the user). A module provided by the invention aggregates or associates the phonebook entry and the data required to automatically create the connection and so provides the contacts bearer information 11d 11d' for the target (other person), as in FIG. 1 or FIG. 4. A module provided by the invention determines which radio/bearer is to be used (or tries some in parallel), as described in FIG. 2. (Thus, a short range radio might be used if the target is within range, and otherwise a wide area radio technology might be used.) A module provided by the invention creates the connection to the target (by possibly only initiating the connection and then calling on other possibly prior art modules to establish the connection), and then networking parameters are discovered if a new network connection is required to transmit the data packets to the recipient, as, e.g., when creating an ad-hoc peer-to-peer connection (e.g. via IPv6 auto-configuration mechanism or DHCP), and applications are then run.

Referring again to FIG. 2, in the step 20 in which a user obtains association information for another user so as to provide records for the other (target) user for the contacts bearer data store 11d, or in other words to create an association of bearers with another user and to save the association as records in the contacts bearer data store, at least two methods can be used.

In a first method of creating an association, the user locates a target (user) in a global "phonebook" directory service, and downloads contact information for the target. In some cases, the contact information will include the link layer addresses and the security information as part of the standard contact card. In cases where the link layer addresses and security information are not included, the user would retrieve the addresses and security information from a separate "bearer association" database. In either case, the association information is obtained based on global/public information, which makes maintaining security more difficult. For example shared secrets cannot be visible for everybody. Use of public and private keys is a known solution when exchanging information in public.

In a second method of creating an association, the association information is exchanged (shared) between devices during a communication established according to the prior art, i.e. without automatic bearer selection according to the invention, or at least by some means besides that provided by the invention. Sharing an association requires (an application or) a service running on both devices. The bearer providing the communication between the devices can be e.g. a RFID bearer and the service can be an association sharing service also as specified or provided as an RFID technology, in which case, when the devices establish communication, the association service on each device shares association information with the other, including e.g. contact card information and also link layer addresses and security information if not included with the contact card information. Note that this method is secure, so a shared secret may be exchanged with the other association information. To create an association using Bluetooth as a bearer, the device in which the association is to be created must first identify a device belonging to the target (person), then create a connection in a standard manner, and finally exchange the association information (the person_id, the link layer addresses, the security key(s), and perhaps also the normal phonebook information if not yet exchanged). Before the association is made, the bearer in the device of the target is visible over Bluetooth only as a located link layer address and as a user-friendly name, e.g. a2:bb:00:01:58:89 and "John's mobile" (or a default, such as "Nokia 3650"). Once the association has been made, it can be stored in the contacts bearer data store 11d 11d', thus providing for future use a mapping of the link layer address to the target (person).

It is to be noted that the description provided here does not require that the association information 11d 11d' for communicating with the user of the second device 12, however obtained by the user of the first device 11, actually be stored in a data store of the first device, although doing so is preferable since it means less work for the user of the first device in subsequent communications with the user of the second device. Instead of storing the association information, it can be obtained as needed, using any of various methods including the two above-described methods, and then discarded. However, the bearer selection strategy information 11b should be stored in the first device 11.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for a communication device, comprising:
    storing in a contacts bearer data store association information for a contact that is indicated in the contacts bearer data store by an identifier, the association information including a list of at least two possible bearers for providing a connection to the contact, wherein each of the at least two possible bearers for the contact is stored so as to be associated with the contact via the identifier for the contact; and
    selecting from the contacts bearer data store one of the at least two possible bearers for the contact based on the identifier and either based on a predetermined selection strategy or based on trying each of the at least two possible bearers in turn until the connection is made;

wherein the selecting of the bearer for the contact is performed automatically without requiring an input by a user of the device.

2. A method as in claim 1, further comprising:
referring to an owner bearer data store to obtain a list of bearers available for use in establishing a connection to another communication device; and
determining a list of both possible and available bearers for the contact by eliminating from the list of possible bearers for the contact any bearer that does not occur on the list of available bearers.

3. A method as in claim 1, wherein a public source of contact information is used in obtaining the association information.

4. A method as in claim 1, wherein in obtaining the association information, a second device communicates to the device the association information needed by the device for automatically selecting a bearer for communication with the contact.

5. A method as in claim 1, wherein the predetermined selection strategy indicates selecting a bearer based on at least one of the following selection criteria: acceptable price; acceptable bandwidth; acceptable latency; as ordered in a list hosted in the device; fastest to connect when the device attempts to make different connections in parallel via different possible bearers; wherein the acceptable price, acceptable bandwidth, and acceptable latency are as compared to predetermined thresholds for price, bandwidth and latency.

6. A method as in claim 1, wherein the predetermined threshold for latency indicates a minimum quality of service requirement for the connection.

7. A method as in claim 1, further comprising periodically comparing the quality of service to the minimum quality of service requirement during communication via the connection and initiating a bearer change if the quality of service is no longer sufficient.

8. A method as in claim 1, wherein the association information includes a bearer identifier for each of at least two different bearers both associated with a same second device.

9. A method as in claim 1, wherein the association information for each bearer includes an indication of the contact, a bearer identifier, and an address for use with the bearer.

10. A method as in claim 1, further comprising receiving an input from a user of the communication device indicating a command to provide a connection for communication with the contact.

11. A computer readable medium encoded with instructions capable of being executed by a computer, wherein said instructions include:
storing in a contacts bearer data store association information for a contact that is indicated in the contacts bearer data store by an identifier, the association information including a list of at least two possible bearers for providing a connection to the contact, wherein each of the at least two possible bearers for the contact is stored so as to be associated with the contact via the identifier for the contact; and
selecting from the contacts bearer data store one of the at least two possible bearers for the contact based on the identifier and either based on a predetermined selection strategy or based on trying each of the at least two possible bearers in turn until the connection is made;
wherein the selecting of the bearer for the contact is performed automatically without requiring an input by a user of the device.

12. An apparatus for use in a communication device, comprising:
a contacts bearer data store, for storing association information for a contact that is indicated in the contacts bearer data store by an identifier, the association information including a list of at least two possible bearers for providing a connection to the contact, wherein each of the at least two possible bearers for the contact is stored so as to be associated with the contact via the identifier for the contact; and
means for selecting from the contacts bearer data store one of the at least two possible bearers for the contact based on the identifier and either based on a predetermined selection strategy or based on trying each of the at least two possible bearers in turn until the connection is made;
wherein the apparatus is configured to select the bearer for the contact automatically without requiring an input by a user of the communication device.

13. An apparatus as in claim 12, wherein the predetermined selection strategy indicates selecting a bearer based on at least one of the following selection criteria: acceptable price; acceptable bandwidth; acceptable latency; as ordered in a list hosted in the communication device; and fastest to connect; and wherein the acceptable price, acceptable bandwidth, and acceptable latency are as compared to predetermined thresholds for price, bandwidth and latency.

14. An apparatus as in claim 12, wherein the association information for each bearer includes an indication of the contact, a bearer identifier, and an address for use with the bearer.

15. An apparatus as in claim 12, further comprising means for receiving an input from a user of the communication device indicating a command to provide a connection for communication with the contact.

16. An apparatus for use in a communication device, comprising:
a contacts bearer data store, for storing association information for a contact that is indicated in the contacts bearer data store by an identifier, the association information including a list of at least two possible bearers for providing a connection to the contact, wherein each of the at least two possible bearers for the contact is stored so as to be associated with the contact via the identifier for the contact; and
a network/bearer selector, for selecting from the contacts bearer data store one of the at least two possible bearers for the contact based on the identifier and either based on a predetermined selection strategy or based on trying each of the at least two possible bearers in turn until the connection is made;
wherein the apparatus is configured to select the bearer for the contact automatically without requiring an input by a user of the communication device.

17. An apparatus as in claim 16, wherein the contacts bearer data store is configured to include for each of the possible bearers for the contact an indication of the contact, a bearer identifier, and an address for use with the bearer.

18. A method for use by a wireless communication device, comprising:
receiving an input from a user of the wireless communication device indicating a command for contacting a second user;
obtaining association information relating to contacting the second user, wherein the association information includes at least two possible bearers for establishing a wireless communication connection with any of one or more devices of the second user, and the association information is related to contacting the second user via an identifier of the second user included with or indicated in the association information;

selecting one of the at least two possible bearers for contacting the second user based on the identifier; and attempting to establish communication with the second user by initializing a wireless communication connection via the selected bearer.

19. A method as in claim 18, wherein the selecting of a bearer is based on a predetermined selection strategy.

20. A method as in claim 18, wherein the selecting of a bearer is based on trying each of the possible bearers in turn until a connection is made for communication with the second user.

21. An apparatus, for use by a wireless communication device, comprising:

means for receiving an input from a user of the wireless communication device indicating a command for contacting a second user;

means for obtaining association information relating to contacting the second user, wherein the association information includes at least two possible bearers for establishing a wireless communication connection with any of one or more devices of the second user, and the association information is related to contacting the second user via an identifier of the second user included with or indicated in the association information;

means for selecting one of the at least two possible bearers for contacting the second user based on the identifier; and means for attempting to establish communication with the second user by initializing a wireless communication connection via the selected bearer.

22. An apparatus as in claim 21, wherein the selecting of a bearer is based on a predetermined selection strategy or is based on trying each of the possible bearers in turn until a connection is made for communication with the second user.

23. An apparatus, for use by a wireless communication device, comprising a processor configured to:

receive an input from a user of the wireless communication device indicating a command for contacting a second user;

obtain association information relating to contacting the second user, wherein the association information includes at least two possible bearers for establishing a wireless communication connection with any of one or more devices of the second user, and the association information is related to contacting the second user via an identifier of the second user included with or indicated in the association information;

select one of the at least two possible bearers for contacting the second user based on the identifier; and attempt to establish communication with the second user by initializing a wireless communication connection via the selected bearer.

24. An apparatus as in claim 23, wherein the selecting of a bearer is based on a predetermined selection strategy.

25. An apparatus as in claim 23, wherein the selecting of a bearer is based on trying each of the at least two possible bearers in turn until a connection is made for communication with the second user.

26. An apparatus as in claim 23, wherein for each bearer the association information includes an indication of the second user via an identifier for the second user, a bearer identifier, and an address for use with the bearer.

* * * * *

UNITED STATES PATENT AND TRADEMARK OFFICE
CERTIFICATE OF CORRECTION

PATENT NO. : 7,280,832 B2  Page 1 of 1
APPLICATION NO. : 10/612398
DATED : July 1, 2003
INVENTOR(S) : Markus Aholainen et al.

It is certified that error appears in the above-identified patent and that said Letters Patent is hereby corrected as shown below:

1. In column 9, line 29, claim 6, line 1, "1" should be --5--.

2. In column 9, line 32, claim 7, line 1, "1" should be --6--.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,280,832 B2 Page 1 of 1
APPLICATION NO. : 10/612398
DATED : October 9, 2007
INVENTOR(S) : Markus Aholainen et al.

It is certified that error appears in the above-identified patent and that said Letters Patent is hereby corrected as shown below:

1. In column 9, line 29, claim 6, line 1, "1" should be --5--.

2. In column 9, line 32, claim 7, line 1, "1" should be --6--.

This certificate supersedes the Certificate of Correction issued May 13, 2008.

Signed and Sealed this

Third Day of June, 2008

JON W. DUDAS
*Director of the United States Patent and Trademark Office*